United States Patent [19]

Brehm et al.

[11] Patent Number: 5,324,793
[45] Date of Patent: Jun. 28, 1994

[54] METHOD FOR MAKING POLYMETHACRYLIMIDE POLYMERS

[75] Inventors: Manfred Brehm, Aschaffenburg; Hartwig Droegemueller, Darmstadt; Norbert Rau, Ober-Ramstadt; Thomas Rhein, Stadecken-Elsheim, all of Fed. Rep. of Germany

[73] Assignee: Röhm GmbH, Darmstadt, Fed. Rep. of Germany

[21] Appl. No.: 944,396

[22] Filed: Sep. 14, 1992

[30] Foreign Application Priority Data

Sep. 14, 1991 [DE] Fed. Rep. of Germany ....... 4130612

[51] Int. Cl.$^5$ ............ C08F 8/48; C08F 8/30; C08F 8/32; C08F 8/00
[52] U.S. Cl. .................. 525/384; 525/329.4; 525/330.3; 525/378; 525/379; 526/258; 526/262; 526/265
[58] Field of Search ............ 525/378, 379, 384, 329.4, 525/330.3; 526/265

[56] References Cited

U.S. PATENT DOCUMENTS

| | | | |
|---|---|---|---|
| 4,246,374 | 1/1981 | Kopchik | 525/329 |
| 4,816,524 | 3/1989 | Anzai | 525/378 |
| 5,023,302 | 6/1991 | Anzai | 525/378 |
| 5,045,604 | 9/1991 | Maurer | 525/378 |
| 5,094,807 | 3/1992 | Maurer | 525/378 |
| 5,096,976 | 3/1992 | Sasaki | 525/330.5 |

FOREIGN PATENT DOCUMENTS

| | | |
|---|---|---|
| 0216505 | 4/1987 | European Pat. Off. . |
| 1113308 | 8/1961 | Fed. Rep. of Germany . |
| 1121335 | 1/1962 | Fed. Rep. of Germany . |
| 3246904 | 6/1984 | Fed. Rep. of Germany . |
| 60-20913 | 2/1985 | Japan . |
| 9204386 | 3/1992 | PCT Int'l Appl. . |

OTHER PUBLICATIONS

Patent Abstracts of Japan, vol. 14, No. 406 (C-754) (49349) Sep. 4, 1990 re JP-A 21 53 904 (Kyowa Gas Chem Inc. Co Ltd, Jun. 13, 1990.
Chemical Abstracts, vol. 103, No. 2, Jul. 1985, No. 6894m re JP-A 6020904 (Mitsubishi Rayon Co Ltd., Feb. 2, 1985.
Chemical Abstracts, vol. 103, No. 24, Dec. 1985, No. 196581c re JP-A 6058409 Mitsubishi Rayon Co Ltd., Apr. 4, 1985.
Chemical Abstracts, 103:6894m (1985).
Chemical Abstracts, vol. 110, No. 6, Mar. 20, 1989, No. 96048k, re JP-A 63191815 Asahi Chemical Industry Co. Ltd. Aug. 9, 1988.

*Primary Examiner*—Fred Zitomer

[57] ABSTRACT

Polymethacrylimide polymers poor in amide or N-alkylamide groups and in carboxyl and carbonic acid anhydride groups are obtained by heating a copolymer consisting of 1 to 60 mol percent of methacrylamide or/and an N-alkyl-methacrylamide and 40-99 mol percent of an alkyl methacrylate or/and phenyl methacrylate in an aliphatic monoalcohol.

2 Claims, No Drawings

METHOD FOR MAKING POLYMETHACRYLIMIDE POLYMERS

The present invention pertains to a method for making polymethacrylimide polymers.

By this term is meant polymers or copolymers having at least 2 mol percent of units of the structure

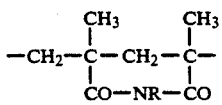

wherein R is a hydrogen atom or an alkyl group. The remaining portion of the polymethacrylimide polymers is composed of other monomers, particularly methacryl monomers. Polymethacrylimide polymers are distinguished in comparison with polymethyl methacrylate, from which they are usually prepared, by a significantly higher glass transition temperature.

STATE OF THE ART

Polymethacrylimide polymers can be prepared by heating copolymers of methacrylamide or N-alkyl methacrylamides and alkyl methacrylates with cleavage of alkanol. According to DE-B 1 113 308, a copolymer of methacrylamide and methyl methacrylate is converted at temperatures from 100°C.–220° C. in the presence of water. According to DE-B 1 121 335 an at least divalent alcohol having a boiling point above 110° C. can be used instead of water, whereby the hydrolysis of ester groups is hindered. Cyclization in a monovalent alcohol, such as butanol, is said not to be possible.

In DE-A 3 246 904, the imidization of polymethacrylamide or copolymers of methacrylamides with methacryl esters in the presence of a solvent is claimed; only the use of water is disclosed in the document.

In the imidization of a copolymer of equal parts by weight of methyl methacrylate and N-methacrylamide in the absence of solvents by heating of a melt at 230° C., JP-A 60 20 904 (cf. Chem. Abstracts 103, No. 6894) teaches that a polymethacryl methylimide polymer having 63 percent of glutarimide units, which correspond to the formula given earlier, is obtained. By complete reaction of the N-methylamide-groups with the ester groups, a nearly pure polymethacryl-N-methylimide would have had to be created.

As is known from EP-A 216,505, the reaction of polymethyl methacrylate with methylamine in an extruder under anhydrous conditions leads to a polymethacryl methylimide polymer with about 5 to 50 percent by weight of units of methacrylic acid or its anhydride. Since these units impair the polymer properties, they are transformed into ester groups according to EP-A 216,505 in a subsequent method step with alkylating agents.

PROBLEM AND SOLUTION

The goal of the invention is a simple method for making polymethacrylimide polymers having a reduced content of amide- or N-alkylamide groups and of carboxyl- and carbonic acid anhydride groups.

Surprisingly, this goal is reached with a method for making polymethacrylimide polymers by heating copolymers of 1 to 60 mol percent of methacrylamide or/and N-alkyl-methacrylamides and 40–99 mol percent of alkyl methacrylates or/and phenyl methacrylate in an organic medium containing hydroxyl groups, if an aliphatic mono-alcohol is used as the medium.

It was not foreseeable that the imidization would proceed in the presence of the aliphatic mono-alcohol with almost complete reaction of the amide- or N-alkyl amide groups, because in the absence of solvents they remain at a low degree of imidization. The fact that any imidization of the polymer is achieved must surprise, since the addition of monovalent alcohols had been described as inhibiting for this reaction.

As is evident from the examples, polymethacryl methylimide polymers having fewer than 15 percent by weight, and particularly with 0 to 2 percent by weight, of N-methyl-methacrylimide units and up to 2 percent by weight of methacrylic acid units are obtained by the imidization of copolymers of N-methyl methacrylamide and methyl methacrylate in methanol at 180° C.–200° C. It seems as if the methacrylic acid units found to be determined by the preparation were already contained in the starting polymers, so that no new carboxyl groups are formed during the method of the invention.

The new polymethacrylimide polymers are suitable for the same fields of use as thermoplastic polymethyl methacrylate synthetic resins, but are distinguished from these by an increased softening temperature. They can, for example, be used as thermoplastic molding compounds by injection molding or extrusion for the preparation of shaped bodies. They can also be mixed with other different thermoplastic synthetic resins, e.g. with polymethyl methacrylate. Further, they can be used as binders for pigments or fibrous materials.

THE STARTING COPOLYMER

The starting copolymer is composed of at most 60 mol percent of methacrylamide or of one or, optionally, more different N-alkyl methacrylamides. At a higher content, ammonia or alkylamine is cleaved during condensation, which can lead to undesired subsequent reactions. For example, an alkylation of the ester groups to form trialkylamines can occur, whereby at the same time carboxyl groups arise in the polymer.

The lower the amount of the amide- or N-alkylamide groups in the starting copolymer, the smaller is the amount of the corresponding methacrylimide units in the final product and the nearer are the glass transition temperature and other polymer properties to those of the starting polymer. Amounts of methacrylamide or-/and N-alkyl-methacrylamide from 10 to 55, particularly 20 to 45, mol percent are preferred. The N-alkyl residue contains as a rule 1 to 20, preferably 1 to 4 C-atoms. N-methyl-methacrylamide is the preferred methacrylamide monomer.

Among the alkyl methacrylates, methyl methacrylate is preferred. Preferably, the ester-alkyl residue contains no more than 4 C-atoms. In addition to methyl groups, above all ethyl-, n-propyl, isopropyl, n-butyl, sec.-butyl, and isobutyl groups come under consideration. Also phenyl methacrylate is suitable. The starting copolymer can also contain mixtures of different ester and amide-units.

In addition to the N-alkyl-methacrylamides and the alkyl methacrylates, further comonomer units can take part in the construction of the starting copolymer. Since they can impair the imidization, their amount is preferably less than 20 mol percent, calculated on the sum of the moles of the monomers involved. For example, comonomers which can be used are styrene and acryl- and/or methacrylonitrile.

In the usual case, the polymethacrylimide polymer to be prepared should be thermoplastically workable and have a molecular weight from about 50,000 to 250,000 Daltons. For use as binders, molecular weights of about 10,000 to 50,000 Daltons also come into consideration.

The starting copolymers are accessible from the mixtures of the corresponding monomer by usual methods for free radical polymerization, for example. For establishing the desired molecular weight, chain transfer agents, for example mercaptans, can be used.

The Aliphatic Mono-Alcohol

The aliphatic mono-alcohol is preferably so chosen that its aliphatic group is contained in the units of the alkyl methacrylate of the starting copolymer, at least in a portion thereof. If the starting copolymer contains units of methyl methacrylate, then methanol is the preferred alcohol. If an alcohol is chosen whose residue is not contained in the ester group of the starting copolymer, then, as a result of transesterification reactions, corresponding ester groups can form in the final product. Although alkanols having 1 to 4 carbon atoms in the alkyl groups are preferred, higher primary alcohols, such as cyclohexanol or ethylene glycol-monobutyl ether can also be used. In the interest of an easy separation, alcohols having a boiling point below 150° C. are preferred. Mixtures of mono-alcohols with other organic solvents, such as aliphatic or aromatic hydrocarbons, e.g. toluene, can also be used.

Evidently during the imidization, the alcohol has a solvating influence on the starting copolymer, which promotes the polymer-analogous conversion of the amide and ester groups. The amount of the alcohol is chosen in am amount such that the imidization occurs in the required degree of completeness. As a rule, 10 to 99 percent, by weight of the reaction mixture, is sufficient; about 20 to 80 percent by weight is preferred.

The Imidization

The imidization occurs in the softened or molten condition of the copolymers at temperatures above 120° C., preferably in the region from 170° C. to 450° C. These temperatures are attainable in pressure reactors, for example at an autogenous pressure of 10 to 70 bar. In order to work at lower pressures, higher-boiling alcohols can also be used. For reaction in an extruder, the operating pressure can optionally far exceed the autogenous pressure of the reaction mixture. It is advantageous, but not compulsory, to stir or knead the mass during the reaction. Suitably, an extruder is used as the reactor. The alcohol can, after conclusion of the reaction, be removed in the form of vapors from the hot reaction mixture, preferably under reduced pressure. This can happen, for example, in the degassing portion of an extruder. The polymethacrylimide polymer can then be removed in molten condition, cooled, and comminuted into a granulate useful as a molding compound.

A better understanding of the present invention and of its advantages will be had by referring to the following specific examples, given by way of illustration.

EXAMPLES

A) Preparation of N-Methyl-Methacrylamide/Methyl Methacrylate Copolymers

Methyl methacrylate (MMA) and N-methyl-methacrylamide (MMam), as well as 0.3 percent, by weight of the addition, of dodecyl mercaptan as a chain transfer agent, were introduced continuously into a stirred vessel together with tert.-butyl peroctoate (TBP) as an initiator in the proportions given in Table 1 for Example A1, A2, and A3. Polymerization took place at a temperature of 150° C. At a dwell time of 48-50 minutes, a conversion of 40-50 percent was reached. A stream of material corresponding to that added to the vessel was continuously removed from the stirred reactor and introduced into a degasification extruder where, at a pressure of 20 mbar and a temperature of 230° C., the unreacted monomers were separated. The composition and the reduced viscosity of the polymers obtained are given in Table 1. The difference from 100 percent of the polymer composition pertains to methacryl-N-methylimide units. The reduced viscosity was determined in chloroform solution.

TABLE 1

| Ex. Nr. | Monomer Addition MMA parts by weight | Monomer Addition MMam parts by weight | Initiator wt.-% TBP based on monomers | Conversion % | Polymer MMA wt.-% | Polymer MMam wt.-% | Reduced Viscosity ml/g |
|---|---|---|---|---|---|---|---|
| A1 | 55 | 45 | 0.029 | 50 | 72 | 27 | 25 |
| A2 | 33 | 67 | 0.017 | 44 | 47 | 50 | 24 |
| A3 | 30 | 70 | 0.045 | 50 | 43 | 54 | 22 |

B. Preparation of a Methacrylamide/Methyl Methacrylate Copolymer

Monomer solutions were prepared from methyl methacrylate (MMA), methacrylamide (MAM), azobis-isobutyronitrile (AIBN) as an initiator, as well as the same amount of dodecyl mercaptan as a chain transfer agent and methanol (MeOH) in the proportions in Table 2 and heated for 24 hours at 70° C., in which time polymerization took place. The polymers precipitated during the polymerization. The filtered polymers were re-precipitated from dimethyl sulfoxide/methanol (B1) or N-methylpyrrolidone/water (B2).

In the preparation of B3, dimethyl sulfoxide was used as the polymerization medium instead of methanol. Dodecyl mercaptan was added in an amount half that of the AIBN. A clear polymer solution formed, from which the polymer could be precipitated by pouring into an excess of water. The polymer was suction filtered, washed with water, and dried at 120° C.

TABLE 2

| Ex. Nr. | Monomer Addition MMA parts by weight | Monomer Addition MMam parts by weight | Initiator wt.-% AIBN based on monomers | MeOH parts by wt. | Polymer MMA wt.-% | Polymer MMam wt.-% | Reduced Viscosity ml/g |
|---|---|---|---|---|---|---|---|
| B1 | 54 | 46 | 0.54 | 773 | 63 | 37 | 55 |
| B2 | 64 | 36 | 0.51 | 400 | 68 | 32 | 83 |

TABLE 2-continued

| Ex. Nr. | Monomer Addition MMA parts by weight | Monomer Addition MMam parts by weight | Initiator wt.-% AIBN based on monomers | MeOH parts by wt. | Polymer MMA wt.-% | Polymer MMam wt.-% | Reduced Viscosity ml/g |
|---|---|---|---|---|---|---|---|
| B3 | 50 | 50 | 0.50 | 400* | 63 | 37 | 75 |

*DMSO

C. Imidization of the polymers A1–A3

20 or 70 g of the comminuted starting copolymers were introduced into a 0.5-liter autoclave together with 40–90 percent, by weight of the reaction mixture, of methanol, and this was heated with stirring after sealing. The highest temperature was maintained for the time reported in Table 3. Subsequently, in order to facilitate removal of the polymer from the reactor, 150 ml of N-methyl pyrrolidone were introduced as a solvent under pressure using a pressure pump. After cooling, the autoclave was opened, the polymer solution removed, and the polymer precipitated by pouring into water acidified with hydrochloric acid, washed, dried, re-precipitated from tetrahydrofuran/water, and dried at 120° C.

TABLE 3

| Ex. No. | Starting Polymer | MeOH (%) | Temp (°C.) | Time (hr) | Press. (bar) | Imide | Ester | Amide | Acid | $T_g$ (°C.) |
|---|---|---|---|---|---|---|---|---|---|---|
| 1 | 20 g A1 | 90 | 180 | 6 | 26 | 49 | 49 | 1.6 | 1.2 | 136 |
| 2 | 70 g A1 | 41 | 210 | 0.5 | 42 | 57 | 42 | 0.4 | 1.6 | 140 |
| 3 | 70 g A1 | 42 | 180 | 6 | 25 | 55 | 45 | 0 | 1.2 | 128 |
| 4 | 70 g A2 | 30 | 205 | 1 | 40 | 88 | 7.8 | 4.5 | — | 198 |
| 5 | 70 g A3 | 42 | 210 | 0.5 | 40 | 79 | 8.5 | 12 | 0.5 | 181 |

D. Imidization of the Polymers B1–B3

70 or 40 parts by weight of the polymers B1 to B3 and 50 or 80 parts by weight of methanol were heated in an autoclave with stirring. After the reaction, N-methyl pyrrolidone was pumped into the hot autoclave and the polymer was dissolved with stirring. The polymer solution was poured into an excess of 1–2 percent hydrochloric acid, whereupon the polymer precipitated. It was suction filtered, washed with water, and dried at 120° C. The composition of the polymer was determined from NMR analysis and determination of the acid number.

TABLE 4

| Ex. No. | Starting Polymer | MeOH (%) | Temp (°C.) | Time (hr) | Imide | Ester | Amide | Acid | $T_g$ (°C.) |
|---|---|---|---|---|---|---|---|---|---|
| 7 | 70 g B1 | 50 | 180 | 6 | 69 | 29 | 1.0 | 1.0 | 187 |
| 8 | 70 g B2 | 50 | 180 | 6 | 57 | 42 | 0.0 | 1.3 | 169 |
| 9 | 40 g B3 | 80 | 210 | 0.5 | 75 | 24 | 0.7 | — | 179 |

We claim:
1. A method for making a polymethacrylimide polymer which comprises heating a mixture of
    A) a copolymer consisting essentially of
        i) from 1 to 60 mol percent of polymerized units of at least one member selected from the group consisting of methacrylamide and N-alkylmethacrylamides and
        ii) from 40 to 99 mol percent of at least one member selected from the group consisting of alkyl methacrylates and phenyl methacrylates, and
    B) at least 10 percent, by weight of said mixture, of an aliphatic monoalcohol having 1 to 4 carbon atoms in the alkyl group,
to a temperature of at least 120° C. under a pressure of at least 10 bars.
2. A method as in claim 1 wherein the alkyl group of said alkyl methacrylate is the same as that present in said aliphatic mono-alcohol.

* * * * *

UNITED STATES PATENT AND TRADEMARK OFFICE
CERTIFICATE OF CORRECTION

PATENT NO.  : 5,324,793
DATED       : June 28, 1994
INVENTOR(S) : Brehm et al.

It is certified that error appears in the above-identified patent and that said Letters Patent is hereby corrected as shown below:

Column 2, line 14, replace "N-methyl-methacrylimide" by -- N-methyl-methacrylamide --.

Signed and Sealed this

Thirty-first Day of January, 1995

Attest:

BRUCE LEHMAN

*Attesting Officer*               *Commissioner of Patents and Trademarks*